US012596695B2

(12) United States Patent
Kim

(10) Patent No.: US 12,596,695 B2
(45) Date of Patent: Apr. 7, 2026

(54) APPARATUS AND METHOD FOR SEARCHING INTERACTIVE DATA THROUGH SEMANTIC INDEX

(71) Applicant: COXWAVE, Seoul (KR)

(72) Inventor: Sang yeop Kim, Seoul (KR)

(73) Assignee: COXWAVE, Seoul (KR)

( * ) Notice: Subject to any disclaimer, the term of this patent is extended or adjusted under 35 U.S.C. 154(b) by 0 days.

(21) Appl. No.: 18/948,029

(22) Filed: Nov. 14, 2024

(65) Prior Publication Data

US 2026/0064647 A1     Mar. 5, 2026

(30) Foreign Application Priority Data

Sep. 2, 2024     (KR) ........................ 10-2024-0118706

(51) Int. Cl.
*G06F 16/22*          (2019.01)
(52) U.S. Cl.
CPC ................................ *G06F 16/2237* (2019.01)
(58) Field of Classification Search
CPC .................................................. G06F 16/2237
USPC ........................................................ 707/741
See application file for complete search history.

(56) References Cited

U.S. PATENT DOCUMENTS

| | | | | |
|---|---|---|---|---|
| 2023/0134852 A1* | 5/2023 | Lee | ..................... | G06F 16/2455 |
| | | | | 707/771 |
| 2024/0104103 A1* | 3/2024 | Sommerlade | .......... | G06F 40/30 |

FOREIGN PATENT DOCUMENTS

| | | | | |
|---|---|---|---|---|
| CN | 118210819 A | * | 6/2024 | .......... G06N 3/0455 |
| CN | 118673122 A | * | 9/2024 | ............. G06N 3/092 |
| KR | 10-2017-0107282 A | | 9/2017 | |
| KR | 20170107282 A | * | 9/2017 | ....... G06F 17/30613 |
| KR | 10-2023-0065054 A | | 5/2023 | |

OTHER PUBLICATIONS

Office Action issued in KR 10-2024-0118706; mailed by the Korean Intellectual Property Office on Oct. 22, 2024.

* cited by examiner

*Primary Examiner* — Giovanna B Colan
(74) *Attorney, Agent, or Firm* — Studebaker Brackett PLLC

(57) ABSTRACT

An embodiment may provide a method of searching interactive data through a semantic index, the method including acquiring interactive data consisting of at least one message; generating a semantic index by converting the message into a sentence structure having a single meaning, wherein the sentence structure is the same for all messages; acquiring a query for a user to search for interactive data; obtaining similarity between the semantic index and the query; returning interactive data corresponding to the query based on the similarity; and providing the user with the interactive data corresponding to the query.

5 Claims, 5 Drawing Sheets

FIG. 3

Start

Convert message semantic index into embedding vector — S401

Generate query semantic index — S403

Convert query semantic index into embedding vector — S405

Obtain embedding vector similarity between message semantic index and query semantic index — S407

Return interactive data corresponding to query according to embedding vector similarity — S409

종료

APPARATUS AND METHOD FOR SEARCHING INTERACTIVE DATA THROUGH SEMANTIC INDEX

CROSS-REFERENCE TO RELATED PATENT APPLICATION

The present application claims priority under 35 U.S.C. § 119 (a) to Korean patent application number 10-2024-0118706 filed on Sep. 2, 2024, in the Korean Intellectual Property Office, the entire disclosure of which is incorporated by reference herein.

BACKGROUND OF THE INVENTION

1. Field

Embodiments of the present invention relate to a technique for searching interactive data through a semantic index, which may improve search performance by decomposing semantic explanations in interactive messages in interactive data into sentences of the same structure with a single meaning.

2. Description of the Related Art

The rapid growth of conversational AI services is increasing the demand for effective information searching from interactive data. Conventionally, keyword-based search methods, for example, best matching (BM)25, were used. This search method refers to a search method that uses specific words or phrases (keywords) to find the desired information. This search method is mainly used in search engines, and may search documents or web pages in a database based on keywords entered by the user to return the most relevant results. However, keyword-based search methods have limitations in capturing the semantic complexity of conversations in interactive data. In particular, this search method did not perform as well as expected in colloquial and diverse styles of interactive data.

To solve this problem, artificial neural network-based semantic search models capable of context recognition were developed. However, since these search models are mainly optimized for document-based question-answering tasks, they had difficulty accurately identifying the characteristics and various contexts of interactive data. Therefore, a method of retraining an artificial neural network model to fit interactive data was proposed. Since this method requires large-scale labeling and adjustment, this method also faced practical difficulties in terms of time and cost. Other search methods such as rewriting search queries or reranking have been attempted, but these have also caused a new problem of reduced user experience due to search time delay.

In this context, an approach method that may improve search performance and minimize search delay at the same time without large-scale labeling or model retraining has become necessary. Recently, with the development of natural language processing (NLP) technology, computers may understand the meaning and context of search words entered by users and generate more accurate search results based thereon. In addition, search engine users want to search in a more natural way and want search results that are highly relevant to the user's intention.

Accordingly, the inventor of the present invention has completed the present invention after a long period of research to improve the accuracy and efficiency of interactive data search and user convenience.

SUMMARY OF THE INVENTION

In this background, one object of the present embodiment is to provide a technology for searching interactive data through a semantic index which converts a message from interactive data consisting of at least one message into a sentence structure having a single meaning to generate a semantic index, and returns interactive data corresponding to a query to a user based on the similarity between the semantic index and the query.

Another object of the present embodiment is to provide a technology for searching interactive data through a semantic index which provides interactive data corresponding to a query based on the similarity between the query and the interactive data and the message as well as the semantic index.

Meanwhile, other unspecified purposes of the present invention will be additionally considered within a range that may be easily inferred from the following detailed description and its effects.

In order to achieve the aforementioned object, an embodiment provides a method of searching interactive data through a semantic index, the method including: acquiring interactive data consisting of at least one message; generating a semantic index by converting the message into a sentence structure having a single meaning, wherein the sentence structure is the same for all messages; acquiring a query for a user to search for interactive data; obtaining similarity between the semantic index and the query; returning interactive data corresponding to the query based on the similarity; and providing the user with the interactive data corresponding to the query.

In the method, the generating of the semantic index may include converting a message semantic index indicating a semantic index for the message into an embedding vector, the acquiring of the query may include generating a query semantic index indicating a semantic index for the query; and converting the query semantic index into an embedding vector, and the obtaining of the similarity between the semantic index and the query may include obtaining an embedding vector similarity between the embedding vector of the message semantic index and the embedding vector of the query semantic index.

In the method, the interactive data may include multiple messages exchanged between multiple interlocutors, and the generating of the semantic index may include generating multiple semantic indices for each of the multiple messages.

In the method, the semantic index may include a subject indicating a sender of the message, an intent of the sender, a target of the intent, and details including additional information about the intent or the target.

In the method, the details may be divided into a first pattern indicating a topic, a second pattern indicating a reason or cause, a third pattern indicating a condition or manner, and a fourth pattern indicating that the additional information is absent.

Another embodiment provides an apparatus for searching interactive data through a semantic index, the apparatus including an interactive data acquisition part configured to acquire interactive data consisting of at least one message; a semantic index generation part configured to generate a semantic index by converting the message into a sentence structure having a single meaning, wherein the sentence structure is the same for all messages; a query acquisition part configured to acquire a query for a user to search for interactive data; a similarity obtaining part configured to obtain similarity between the semantic index and the query; an interactive data return part configured to return interactive data corresponding to the query based on the similarity; and an interactive data provision part configured to provide the user with the interactive data corresponding to the query.

As described above, according to embodiments, it is possible to provide an interactive data search method that effectively captures semantic intent from interactive data and exhibits high performance.

In addition, according to embodiments, it is possible to provide an interactive data search method that may achieve high performance without extensive labeling, training, or fine-tuning.

In addition, according to embodiments, it is possible to improve the accuracy of the search without increasing the delay time of the search.

In addition, even if not explicitly mentioned herein, the effects described in the following specification expected by the technical features of the present disclosure and their potential effects are treated as described in the specification of the present disclosure.

BRIEF DESCRIPTION OF THE DRAWINGS

FIG. 3 is a diagram showing examples of interactive data according to an embodiment.

Figure 1:
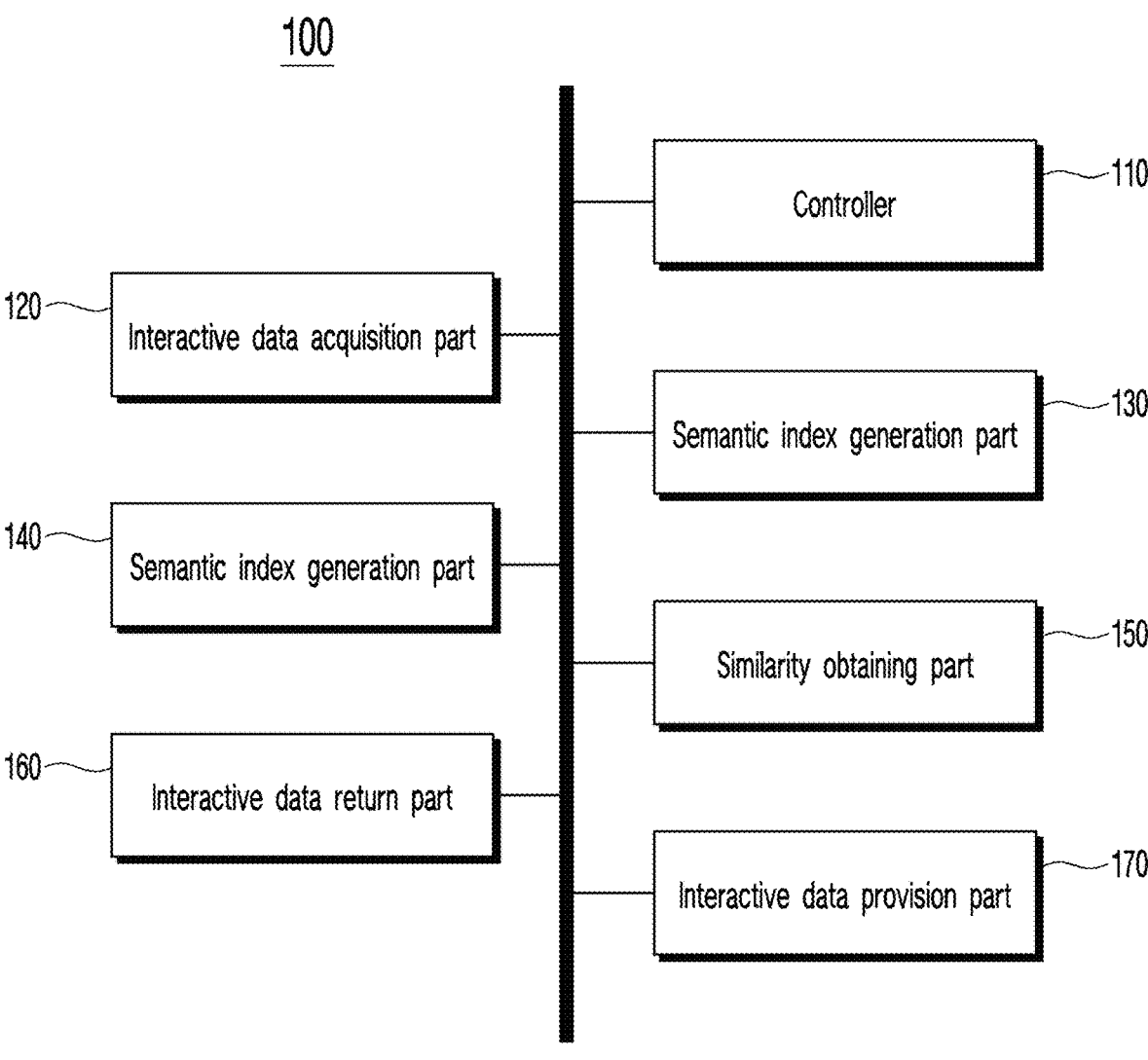
FIG. 1 is a block diagram of an apparatus for searching interactive data through a semantic index according to an embodiment.

The accompanying drawings are illustrated for reference to understand the technical idea of the present disclosure, and the scope of the rights of the present disclosure is not limited thereby.

DETAILED DESCRIPTION

Hereinafter, some embodiments of the present invention will be described in detail with reference to exemplary drawings. When adding reference numerals to components in each drawing, it should be noted that the same components are given the same numerals as much as possible even if they are shown in different drawings. In addition, when describing the present invention, if it is determined that a specific description of a related known configuration or function may obscure the gist of the present invention, the detailed description thereof will be omitted.

In addition, when describing components of the present invention, terms such as first, second, A, B, (a), (b), etc., may be used. These terms are only intended to distinguish the components from other components, and the nature, order, or sequence of the corresponding components are not limited by the terms. When a component is described as being "connected," "coupled," or "linked" to another component, it should be understood that the component may be directly connected or linked to the other component, but another component may also be "connected," "coupled," or "linked" between the components.

Figure 2:
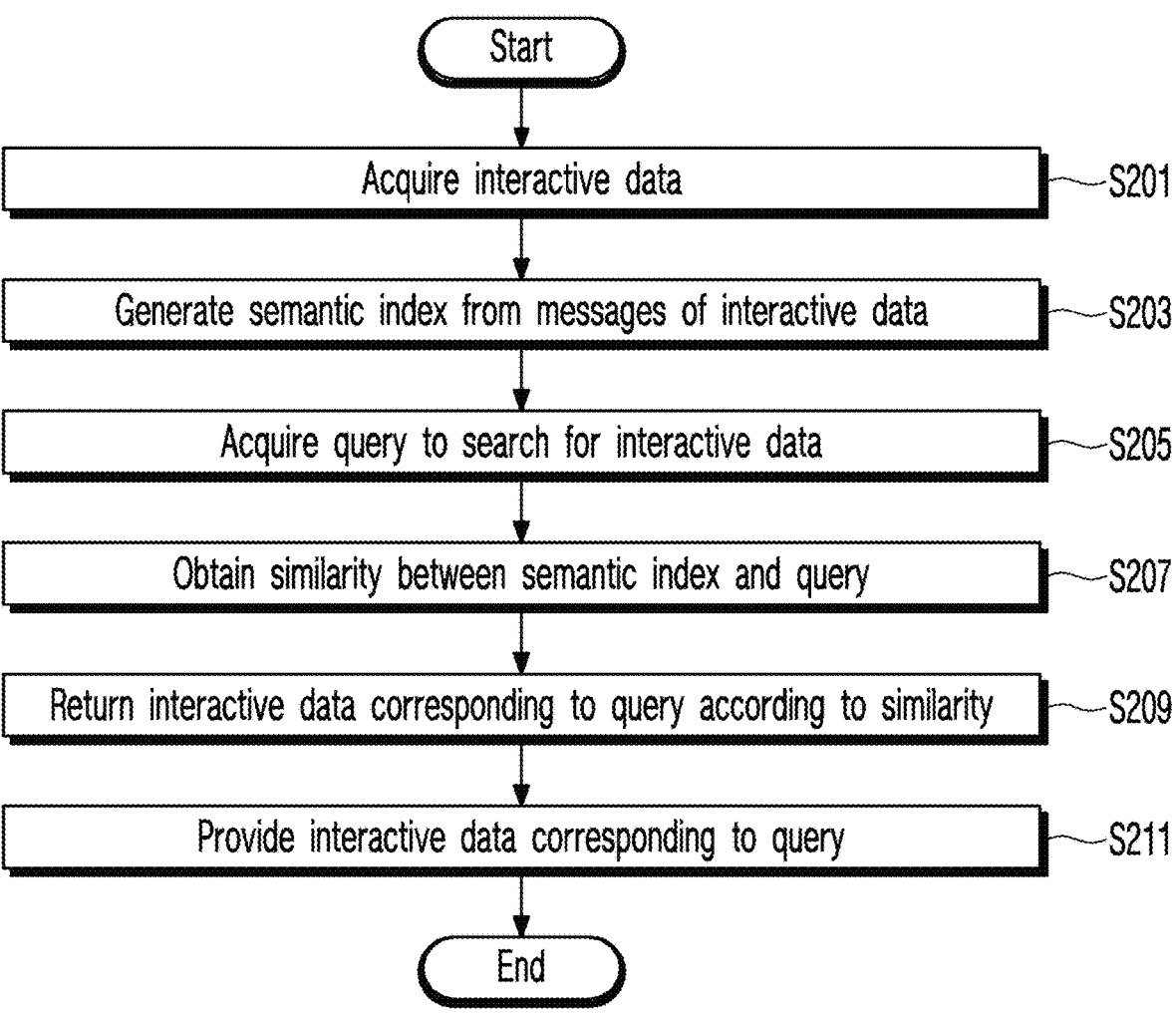
FIG. 2 is a flowchart illustrating a method of searching interactive data through a semantic index according to an embodiment.
Figure 3:
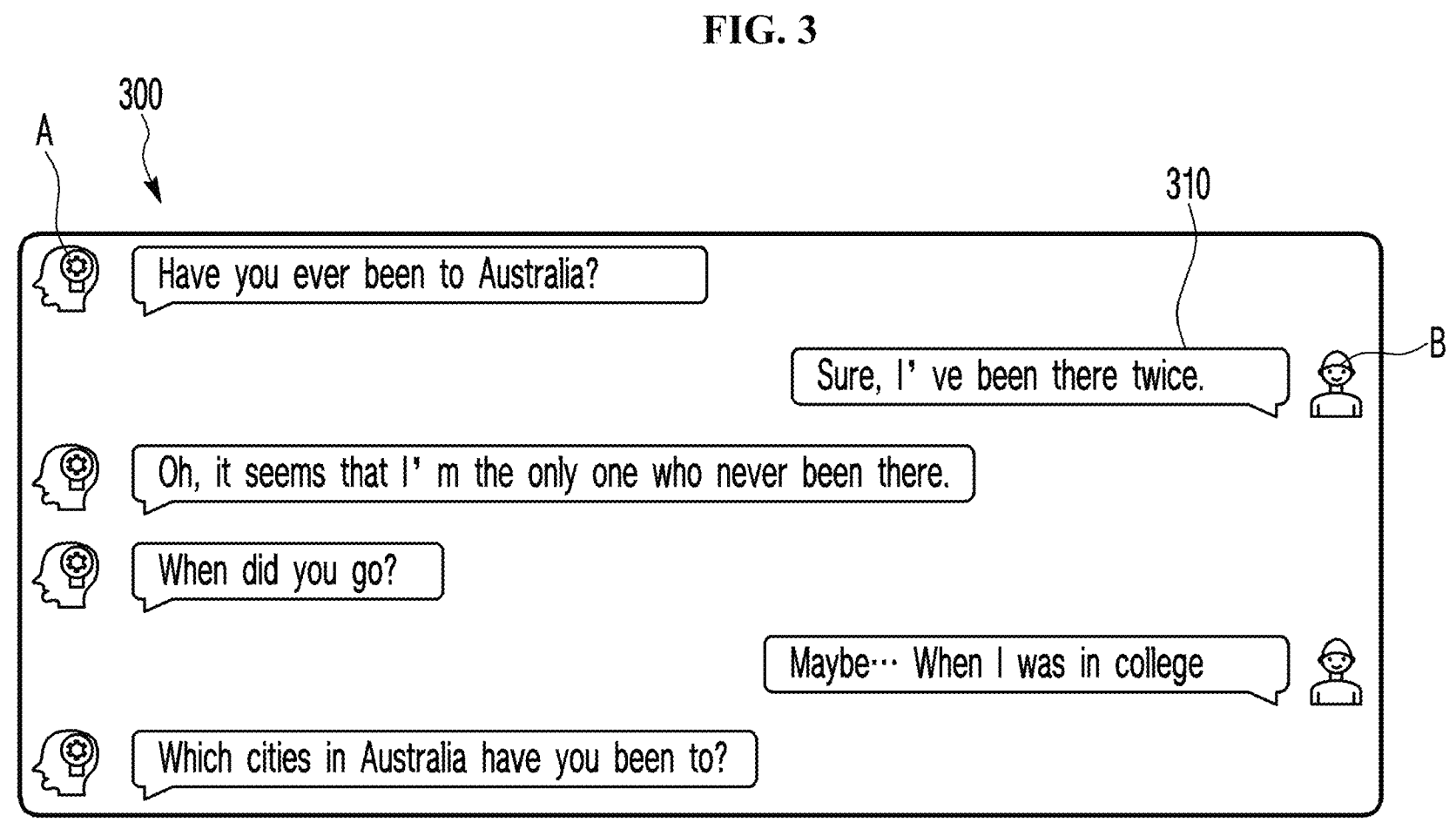

FIG. 1 is a block diagram of an apparatus for searching interactive data through a semantic index according to an embodiment, FIG. 2 is a flowchart illustrating a method of searching interactive data through a semantic index according to an embodiment, and FIG. 3 is a diagram showing examples of interactive data according to an embodiment.

Referring to FIG. 1, an apparatus 100 for searching interactive data through a semantic index (hereinafter referred to as "apparatus") according to an embodiment may include a controller 110, an interactive data acquisition part 120, a semantic index generation part 130, a query acquisition part 140, a similarity obtaining part 150, an interactive data return part 160, and an interactive data provision part 170. Referring to FIG. 2, a method of searching interactive data through a semantic index by the apparatus 100 according to an embodiment may be illustrated. The apparatus 100 may be implemented as a software module and a hardware module, and the configuration described in this specification may be described by dividing it into categories according to function regardless of its form.

The apparatus 100 according to an embodiment may search for and provide interactive data desired by a user. Here, the interactive data may be understood as a conversation including messages exchanged between at least one interlocutor, i.e., preferably, two interlocutors. Referring to FIG. 3, an example of interactive data according to an embodiment may be illustrated. The interactive data 300 may consist of messages 310 exchanged between interlocutor A (A) and interlocutor B (B). The interactive data 300 includes a conversation about an experience of traveling to Australia, and includes content in which interlocutor A (A) asks interlocutor B (B) about such an experience. When a user wishes to search for a specific conversation and inputs a query corresponding thereto, the apparatus 100 may search for such interactive data 300 and provide the appropriate interactive data 300 to the user. In this example, when the user requests to search for interactive data that talks about travel or experiences in Australia, the apparatus 100 may search for such interactive data 300 and provide it to the user.

Returning to FIGS. 1 and 2, in the apparatus 100 according to an embodiment, the controller 110 may control the overall configuration of the apparatus 100. The controller 110 may include a processor and a memory. The memory may store software or a program. In addition, the memory may store at least one command for operating the apparatus 100 according to the program. The processor may control the overall operation of the apparatus 100. The processor may include at least one specialized processor corresponding to each function, or may be a processor integrated into one. The processor may execute a program stored in the memory, read data or a file stored in the memory, or store new data or a new file in the memory. The processor may execute commands stored in the memory.

The interactive data acquisition part 120 may acquire interactive data consisting of at least one message (step S201). The interactive data acquisition part 120 may collect the interactive data (300 of FIG. 3) and the message composing it (310 of FIG. 3) as described above. The interactive data acquisition part 120 may also collect and acquire metadata that may define or specify the interactive data, for example, the ID, time, and/or location of the interactive data.

In addition, the semantic index generation part 130 may receive the interactive data from the interactive data acquisition part 120 and generate a semantic index from the interactive data (step S203). The semantic index generation part 130 may extract all messages included in the interactive data regardless of the interlocutor and generate a semantic index for each message.

Here, the semantic index may be a form in which the message is converted so that the message has a single meaning and a certain sentence structure. At least one semantic index is generated from each message of all interlocutors participating in the conversation and has a single meaning of each message, but may all have the same sentence structure. Specifically, the sentence structure may include a subject, an intent, a target, and details. The subject indicates the sender of the message and may include all senders participating in the conversation. For example, the subject may be "user" or "assistant." The intent indicates the action or intent of the sender and may appear as a singular present tense verb. For example, the intent may be "asks", "explains", or "wants to". The target indicates the target of the intent or the object of the intent, and may generally be expressed in three words or less. Therefore, if the target is specific, it may be expressed in a general way. For example, the target may be "weather" or "product details". Details may indicate additional information about the intent or target. Details may have various types, and may be represented by dividing them into the following four patterns.

The first pattern may indicate the topic of interactive data. The details of the first pattern may indicate the specificity of the target of a conversation, or the target of an emotion or an action, and may be expressed with prepositions or the like. For example, the details of the first pattern may be "about climate change", "regarding customer complaints", "concerning the new product launch", "on the topic of renewable energy", or "towards improving user experience". The second pattern may indicate the reason for an action or the cause of a situation, and may be expressed with prepositions or conjunctions or the like. For example, the details of the second pattern may be "due to technical issues", "because of unexpected demand", "owing to budget constraints", "as a result of market changes", or "in response to user feedback". The third pattern may indicate the conditions or circumstances under which an action occurs, or the way to perform the action, and may be expressed with prepositions or conjunctions or the like. For example, the details of the third pattern may be "with patience", "under tight deadlines", "using the latest technology", "during the holiday season", or "through collaborative efforts". The fourth pattern may indicate that there is no additional information corresponding to the details. This corresponds to the case where the generation of additional information is impossible or the additional information is meaningless.

As such, the semantic index may extract a single meaning to be conveyed from each message, and may have a sentence structure consisting of a subject, intent, target, and detail, i.e., Subject-Intent-Target-Detail (STID) to express this single meaning. In the example of the interactive data described above, each message of the interlocutor A and the interlocutor B may be converted into an STID structure having a single meaning, and the converted message may be a semantic index. By using the semantic index of the STID structure, the apparatus according to an embodiment may have the following effects.

All messages are converted into the format of "Subject+Intent+Target+Detail", so that structural consistency may be maintained. This may greatly reduce the complexity of data processing and analysis. In addition, a message of an interlocutor with complex and diverse meanings may be separated into a SITD containing only a single meaning. This allows each element (S, I, T, D) to be clearly defined, making it easy to grasp the core meaning of the message, which may greatly contribute to improving search accuracy. By providing additional contextual information in the details, the nuance of the message may be maintained even in a simplified structure.

In addition, the semantic index generation part 130 may extract the sentence structure of the STID using a large-scale language model (LLM). The semantic index generation part 130 is not limited to a specific LLM and may utilize various LLMs. Here, the semantic index generation part 130 may more accurately grasp the meaning by considering the contextual information of the message that came before the corresponding message in order to extract the sentence structure.

In addition, the semantic index generation part 130 may convert the semantic index for the message of the interactive data, i.e., the message semantic index, into an embedding vector using an embedding model, such as BERT, sentence transformer, etc. The semantic index generation part 130 is not limited to a specific embedding model and may use various embedding models. The semantic index generation part 130 may store the embedding vector of the message semantic index in a database, such as a vector database. In addition, the semantic index generation part 130 may store the original text (interactive data and messages included in the interactive data) and metadata in the database in addition to the embedding vector of the message semantic index. Then, the embedding vector of the message semantic index may maintain the context between the original text and the metadata.

In addition, the semantic index generation part 130 may generate an embedding vector for not only the embedding vector for the message semantic index, but also the original text (interactive data and messages included in the interactive data) through the embedding model. The semantic index generation part 130 may store the embedding vectors for the interactive data and the message itself in a database together with the embedding vector of the message semantic index.

Next, when the semantic index generation part 130 generates the semantic index, the query acquisition part 140 may acquire a query from the user in order to search for the interactive data desired by the user (step S205). The query may be understood as a question that the user inputs into the apparatus 100 in order to search for the interactive data. The query may also be expressed in the sentence structure of STID in the same form as the message. The query acquisition part 140 may also convert the query into a semantic index in the same manner as the message. When the query is converted into the sentence structure of STID, a semantic index for the query, i.e., a query semantic index, may be generated. In addition, the query acquisition part 140 may also convert the query semantic index into an embedding vector through the embedding model. The query acquisition part 140 may store the embedding vector of the query semantic index in the database.

Meanwhile, the similarity obtaining part 150 may obtain the similarity between the semantic index (for the message) and the query (step S207). The similarity obtaining part 150 may use a vector similarity function, for example, a cosine similarity function, to obtain the similarity. Specifically, the similarity obtaining part 150 may load the embedding vector of the message semantic index stored in the database by the semantic index generation part 130. The similarity obtaining part 150 may also load the embedding vector of the query semantic index from the database or receive it from the query acquisition part 140. The similarity obtaining part 150 may obtain the vector similarity between the embedding vector of the message semantic index and the embedding vector of the query semantic index through the vector similarity function.

In addition, the interactive data return part 160 may receive the similarity from the similarity obtaining part 150 and return interactive data corresponding to the query based on the similarity (step S209). The interactive data return part 160 may extract interactive data having the highest similarity with the query semantic index based on the similarity obtained by the similarity obtaining part 150. For example, the interactive data return part 160 may extract interactive data including a message corresponding to the message semantic index having the highest similarity with the query semantic index. Thereafter, the interactive data return part 160 may return the extracted interactive data as interactive data that the user wants to search through the query. The detailed process of the interactive data return part 160 obtaining the similarity and returning the interactive data will be described later.

The interactive data provision part 170 may provide the user with interactive data corresponding to the query (step S211). The interactive data provision part 170 may receive interactive data having the highest similarity to the query semantic index from the interactive data return part 160, and provide it to the user as interactive data corresponding to the query.

Figure 4:
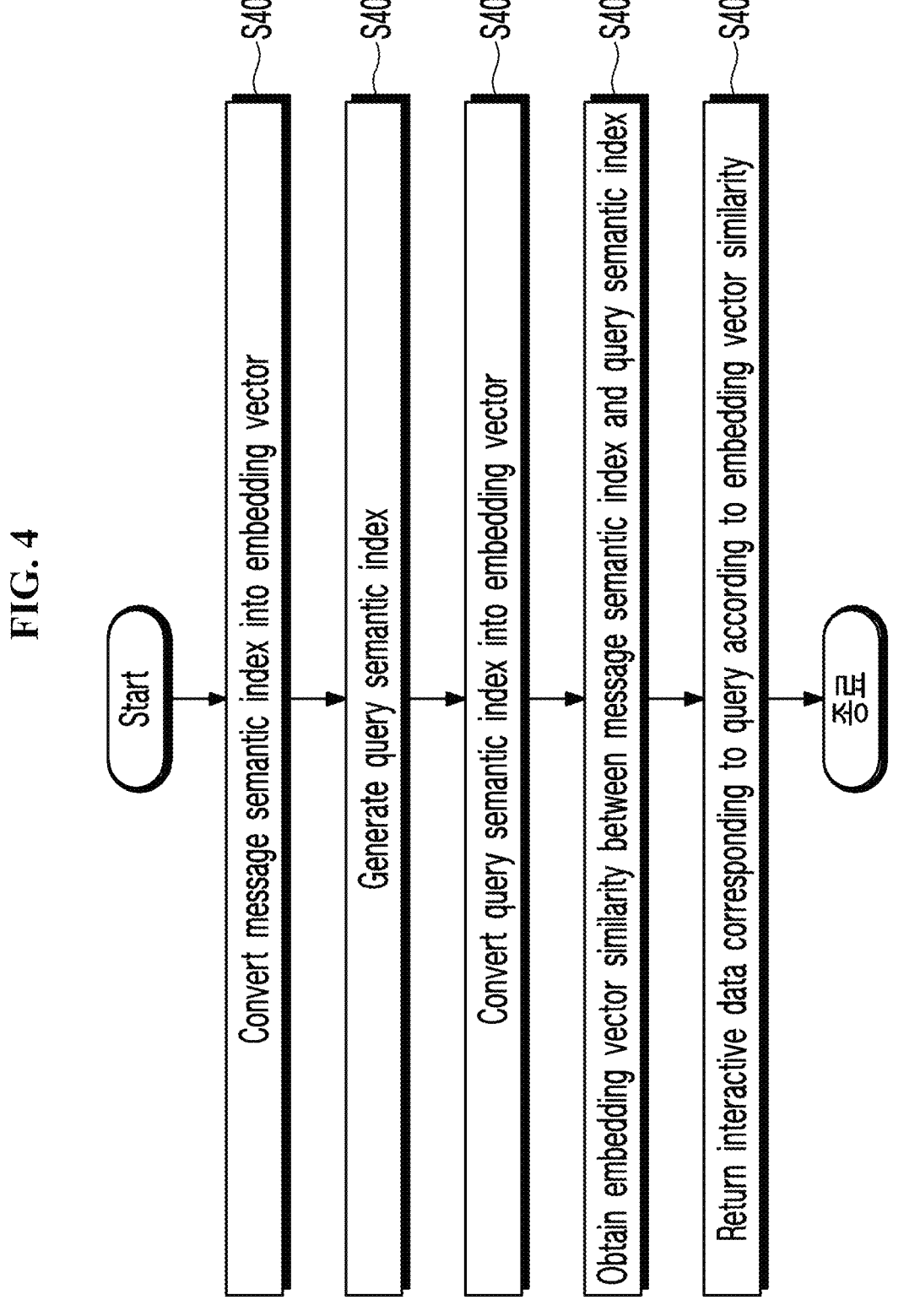
FIG. 4 is a flowchart of obtaining similarity in a method of searching interactive data through a semantic index according to an embodiment.

FIG. 4 is a flowchart of obtaining similarity in a method of searching interactive data through a semantic index according to an embodiment.

Referring to FIG. 4, a method of obtaining similarity by an apparatus according to an embodiment may be illustrated. First, the semantic index generation part may extract messages from the interactive data, generate a semantic index for each message, and convert the message semantic index into an embedding vector (step S401).

The query acquisition part may acquire a query from a user, convert it into a semantic index, and generate a query semantic index (step S403). The query acquisition part may convert the query into a sentence structure of the STID in the same manner as the method of converting a message into a semantic index. In addition, the query acquisition part may convert the query semantic index into an embedding vector (step S405).

The similarity obtaining part may receive the message semantic index and the query semantic index, and may obtain the similarity between the message semantic index and the query semantic index, i.e. the similarity of the embedding vector, through the similarity model for the embedding vector (step S407).

The interactive data return part may return interactive data corresponding to the query according to the similarity of the embedding vector. The interactive data return part may select and return interactive data having the highest similarity to the query semantic index (step S409).

Figure 5:
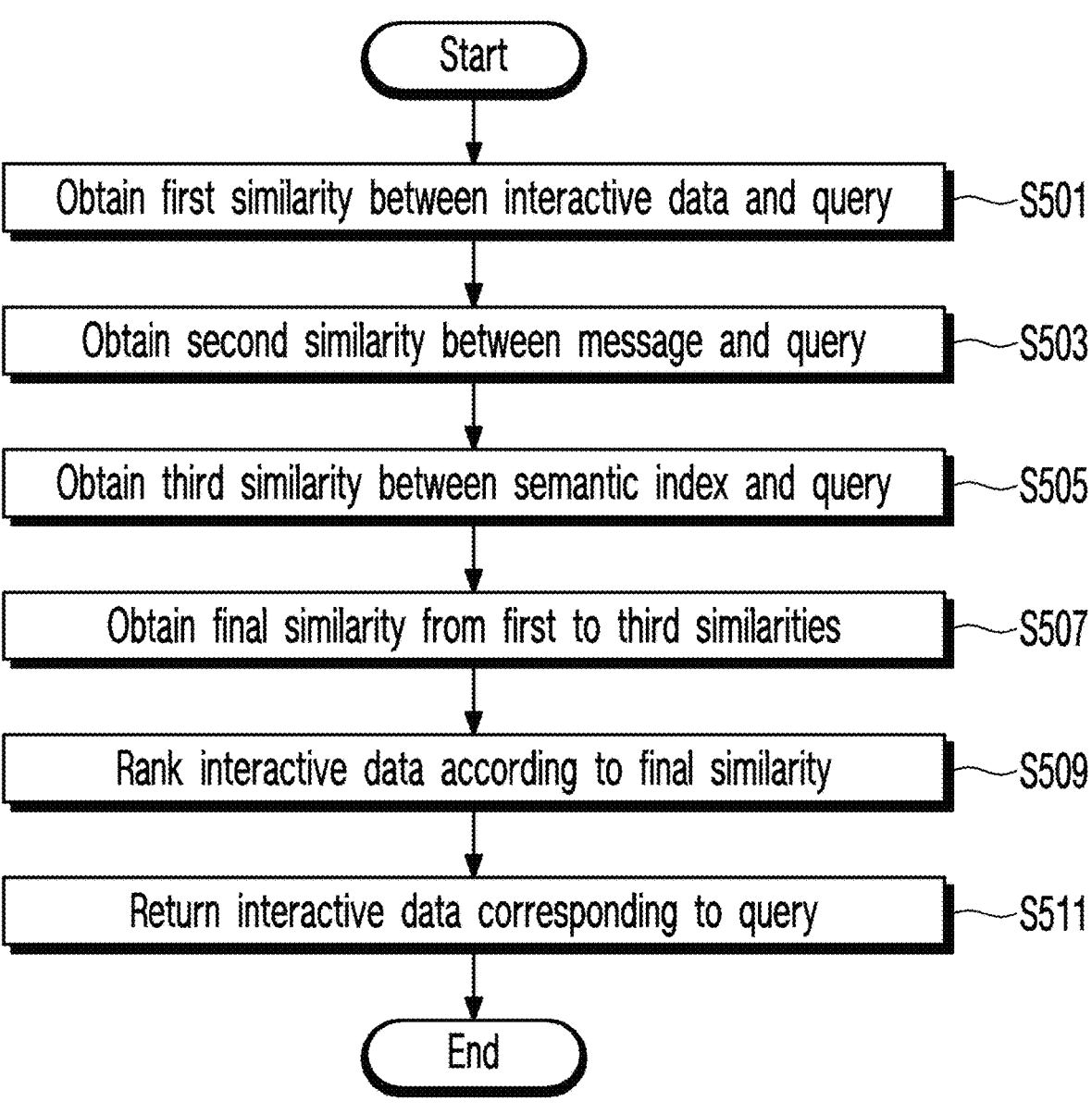
FIG. 5 is a flowchart of returning interactive data based on similarity in a method of searching interactive data through a semantic index according to an embodiment.

FIG. 5 is a flowchart of returning interactive data based on similarity in a method of searching interactive data through a semantic index according to an embodiment.

Referring to FIG. 5, a method of returning interactive data based on similarity by an apparatus according to an embodiment may be illustrated. The apparatus according to an embodiment may reflect not only the similarity between a query and a message semantic index, but also the similarity between a query and interactive data itself or the similarity between a query and a message itself in order to obtain the similarity.

The similarity obtaining part may acquire an embedding vector of interactive data in which the interactive data is converted into an embedding vector, and obtain the similarity, i.e., a first similarity, between the embedding vector of the interactive data and the embedding vector of the query (step S501).

The similarity obtaining part may acquire an embedding vector of a message in which the message included in the interactive data is converted into an embedding vector, and obtain the similarity, i.e., a second similarity, between the embedding vector of the message and the embedding vector of the query (step S503).

The similarity obtaining part may acquire an embedding vector of a message semantic index, and obtain the similarity, i.e., a third similarity, between the embedding vector of the message semantic index and the embedding vector of the query (step S505). Here, for the third similarity, the similarity obtaining part used the embedding vector of the message semantic index, but is not limited thereto and may use the embedding vector of the interactive data.

In addition, the similarity obtaining part may obtain the final similarity from the first to third similarities (step S507). Specifically, the similarity obtaining part may calculate a score through the first to third similarities. In addition, the similarity obtaining part may apply weights. For example, the similarity obtaining part may apply the first to third weights to the first similarity between the interactive data and the query, the second similarity between the message and the query, and the third similarity between the message semantic index and the query, respectively. The similarity obtaining part may obtain a score by applying the first to third weights to the first to third similarities, and extract the interactive data having the highest score. Therefore, the similarity obtaining part may finally obtain the similarity as in the following Mathematical Equation 1.

$$\text{Score}=w\_conv \times S\_conv + \max(w\_msg \times S\_msg) + \max(w\_sitd \times S\_sitd) \qquad \text{[Mathematical Equation 1]}$$

Here, S_conv may represent the similarity between the interactive data and the query, S_msg may represent the similarity between the message and the query, S_sitd may represent the similarity between the message semantic index and the query, w_conv can represent the weight of the interactive data, w_msg may represent the weight of the message, and w_sitd may represent the weight of the message semantic index, respectively. In addition, max (w_msg×S_msg) may represent the maximum similarity applied with the similarity between the message and the query and the weight of the message, and max (w_sitd×S_sitd) may represent the maximum similarity applied with the similarity between the message semantic index and the query and the weight of the message semantic index, respectively.

In this drawing, in order to return interactive data, the apparatus according to an embodiment used interactive data or messages to obtain the similarity with the query, but may obtain the similarity with the query by reflecting metadata.

The similarity obtaining part may rank the interactive data according to the finally obtained similarity (step S509). The similarity obtaining part may rank the interactive data in order of high similarity. In addition, the similarity obtaining part may return certain top several interactive data as interactive data corresponding to the query (step S511).

The terms "include," "compose," or "have" described above, unless otherwise specifically stated, mean that the corresponding component may be inherent, and therefore should be interpreted as including other components rather than excluding other components. All terms, including technical or scientific terms, unless otherwise defined, have the same meaning as commonly understood by a person of ordinary skill in the art to which the present invention belongs. Commonly used terms, such as terms defined in dictionaries, should be interpreted as being consistent with the meaning in the context of the relevant technology, and shall not be interpreted in an ideal or overly formal sense unless explicitly defined in the present invention.

The above description is merely an exemplary description of the technical idea of the present invention, and those of ordinary skill in the art to which the present invention belongs may make various modifications and variations without departing from the essential characteristics of the present invention. Therefore, the embodiments disclosed in the present invention are not intended to limit the technical idea of the present invention, but to explain it, and the scope of the technical idea of the present invention is not limited by these embodiments. The scope of protection of the present invention should be interpreted by the claims below, and all technical ideas within a scope equivalent thereto should be interpreted as being included in the scope of the rights of the present invention.

What is claimed is:

1. A method of searching interactive data through a semantic index, the method comprising:

acquiring interactive data consisting of at least one message;

generating a semantic index by converting the message into a sentence structure having a single meaning, wherein the sentence structure is the same for all messages;

acquiring a query for a user to search for interactive data, wherein the acquiring of the query comprises:

generating a query semantic index indicating a semantic index for the query; and converting the query semantic index into a query embedding vector;

obtaining similarity between the semantic index and the query, wherein the obtaining comprises:

acquiring a first embedding vector, which is converted from the interactive data, and obtaining a first similarity between the first embedding vector and the query embedding vector;

acquiring a second embedding vector, which is converted from the message included in the interactive data, and obtaining a second similarity between the second embedding vector and the query embedding vector;

acquiring a third embedding vector, which is converted from a message semantic index indicating a semantic index for the message, and obtaining the third similarity between the third embedding vector and the query embedding vector; and calculating scores through the first similarity, the second similarity, and the third similarity, by applying a first weight to the first similarity, a second weight to the second similarity, and a third weight to the third similarity;

extracting the interactive data having the highest score among the calculated scores;

and providing the user with the extracted interactive data.

2. The method according to claim 1, wherein the interactive data comprises multiple messages exchanged between multiple interlocutors, and the generating of the semantic index comprises generating multiple semantic indices for each of the multiple messages.

3. The method according to claim 1, wherein the semantic index comprises a subject indicating a sender of the message, an intent of the sender, a target of the intent, and details comprising additional information about the intent or the target.

4. The method according to claim 3, wherein the details are divided into a first pattern indicating a topic, a second pattern indicating a reason or cause, a third pattern indicating a condition or manner, and a fourth pattern indicating that the additional information is absent.

5. An apparatus for searching interactive data through a semantic index, the apparatus comprising:

an interactive data acquisition part configured to acquire interactive data consisting of at least one message;

a semantic index generation part configured to generate a semantic index by converting the message into a sentence structure having a single meaning, wherein the sentence structure is the same for all messages;

a query acquisition part configured to acquire a query for a user to search for interactive data, by performing:

generating a query semantic index indicating a semantic index for the query; and converting the query semantic index into a query embedding vector;

a similarity obtaining part configured to obtain similarity between the semantic index and the query by performing:

acquiring a first embedding vector, which is converted from the interactive data, and obtaining a first similarity between the first embedding vector and the query embedding vector;

acquiring a second embedding vector, which is converted from the message included in the interactive data, and obtaining a second similarity between the second embedding vector and the query embedding vector;

acquiring a third embedding vector, which is converted from a message semantic index indicating a semantic index for the message, and obtaining the third similarity between the third embedding vector and the query embedding vector; and calculating scores through the first similarity, the second similarity, and the third similarity, by applying a first weight to the first similarity, a second weight to the second similarity, and a third weight to the third similarity;

an interactive data provision part configured to extract the interactive data having the highest score among the calculated scores, and provide the user with the extracted interactive data.

* * * * *